(12) United States Patent
McDowall et al.

(10) Patent No.: US 7,584,291 B2
(45) Date of Patent: Sep. 1, 2009

(54) SYSTEM AND METHOD FOR LIMITING DEAD AIR TIME IN INTERNET STREAMING MEDIA DELIVERY

(75) Inventors: Ian E. McDowall, Mountain View, CA (US); Mark T. Bolas, Mountain View, CA (US)

(73) Assignee: Mosi Media, LLC, Wilmington, DE (US)

( * ) Notice: Subject to any disclaimer, the term of this patent is extended or adjusted under 35 U.S.C. 154(b) by 109 days.

(21) Appl. No.: 11/041,148

(22) Filed: Jan. 21, 2005

(65) Prior Publication Data

US 2005/0165942 A1 Jul. 28, 2005

Related U.S. Application Data

(63) Continuation of application No. 09/570,837, filed on May 12, 2000, now abandoned.

(51) Int. Cl.
*G06F 15/16* (2006.01)
(52) U.S. Cl. ...................................................... 709/231
(58) Field of Classification Search ......... 709/217–219, 709/227–229, 231
See application file for complete search history.

(56) References Cited

U.S. PATENT DOCUMENTS

| 5,014,301 | A | * | 5/1991 | Maltezos ..................... 379/155 |
| 5,142,528 | A | | 8/1992 | Kobayashi .................... 370/79 |
| 5,490,275 | A | | 2/1996 | Sandvos |
| 5,557,541 | A | | 9/1996 | Schulhof et al. ......... 364/400.1 |
| 5,572,442 | A | | 11/1996 | Schulhof et al. ............ 709/219 |
| 5,629,867 | A | | 5/1997 | Goldman ..................... 381/77 |
| 5,721,956 | A | | 2/1998 | Martin et al. |
| 5,726,909 | A | | 3/1998 | Krikorian .................... 700/94 |
| 5,734,119 | A | * | 3/1998 | France et al. .................. 84/622 |
| 5,790,423 | A | | 8/1998 | Lau et al. ............... 364/400.01 |
| 5,809,246 | A | | 9/1998 | Goldman ............... 395/200.47 |
| 5,815,707 | A | | 9/1998 | Krause et al. |
| 5,822,537 | A | | 10/1998 | Katseff et al. |
| 5,828,839 | A | | 10/1998 | Moncreiff .............. 395/200.34 |
| 5,841,979 | A | | 11/1998 | Schulhof et al. ........ 395/200.67 |
| 5,844,158 | A | | 12/1998 | Butler et al. ................... 84/650 |
| 5,892,536 | A | | 4/1999 | Logan .......................... 348/13 |
| 5,922,045 | A | | 7/1999 | Hanson ...................... 709/206 |
| 5,926,624 | A | | 7/1999 | Katz ...................... 395/200.47 |
| 5,956,681 | A | | 9/1999 | Yamakita .................... 704/260 |
| 6,005,563 | A | | 12/1999 | White et al. |
| 6,012,086 | A | | 1/2000 | Lowell ........................ 709/218 |
| 6,014,569 | A | * | 1/2000 | Bottum ....................... 455/466 |
| 6,047,323 | A | | 4/2000 | Krause |
| 6,163,683 | A | * | 12/2000 | Dunn et al. ............... 455/151.1 |

(Continued)

OTHER PUBLICATIONS

U.S. Appl. No. 09/798,797, entitled "System and method for minimizing perceived dead air time in internet streaming media delivery", by Jonathan Logan, David Frerichs, and James Eric Mason, filed on Feb. 27, 2001.

(Continued)

*Primary Examiner*—Jeffrey Pwu
*Assistant Examiner*—Benjamin R Bruckart

(57) ABSTRACT

An system for receiving streaming audio or other audio sources netcast in streaming audio content, where the system avoids dead air time in the audio play by providing an alternative audio content to fill time spent negotiating connections and buffering information.

30 Claims, 2 Drawing Sheets

U.S. PATENT DOCUMENTS

| | | |
|---|---|---|
| 6,222,979 B1 | 4/2001 | Willis et al. |
| 6,223,292 B1 | 4/2001 | Dean et al. |
| 6,226,616 B1 | 5/2001 | You et al. |
| 6,248,946 B1 * | 6/2001 | Dwek ................... 84/609 |
| 6,249,810 B1 | 6/2001 | Kiraly |
| 6,269,456 B1 * | 7/2001 | Hodges et al. ............. 714/38 |
| 6,289,207 B1 | 9/2001 | Hudecek et al. |
| 6,385,212 B1 | 5/2002 | Baba et al. |
| 6,405,255 B1 | 6/2002 | Stoltz et al. |
| 6,408,315 B1 | 6/2002 | McManus et al. |
| 6,430,236 B1 | 8/2002 | Funakoshi |
| 6,449,260 B1 * | 9/2002 | Sassin et al. ............ 370/270 |
| 6,456,601 B1 * | 9/2002 | Kozdon et al. ........... 370/259 |
| 6,493,446 B1 * | 12/2002 | Cherry ................. 379/265.05 |
| 6,496,205 B1 * | 12/2002 | White et al. ............. 715/824 |
| 6,526,041 B1 * | 2/2003 | Shaffer et al. ............ 370/352 |
| 6,539,417 B2 | 3/2003 | Stern ................... 709/203 |
| 6,546,427 B1 * | 4/2003 | Ehrlich et al. ............ 709/231 |
| 6,625,656 B2 * | 9/2003 | Goldhor et al. .......... 709/231 |
| 6,654,367 B1 * | 11/2003 | Kaufman ............... 370/356 |
| 6,662,231 B1 | 12/2003 | Drosset et al. |
| 6,678,215 B1 * | 1/2004 | Treyz et al. .............. 368/10 |
| 6,721,489 B1 | 4/2004 | Benyamin et al. |
| 6,728,763 B1 | 4/2004 | Chen |
| 6,728,776 B1 * | 4/2004 | Colbath ................. 709/231 |
| 6,766,376 B2 | 7/2004 | Price |
| 6,769,027 B1 | 7/2004 | Gebhardt et al. |
| 6,769,028 B1 | 7/2004 | Sass et al. |
| 6,823,225 B1 | 11/2004 | Sass |
| 6,836,478 B1 * | 12/2004 | Huang et al. ............. 370/352 |
| 6,848,002 B1 | 1/2005 | Detlef |
| 7,136,475 B1 * | 11/2006 | Rogers et al. .......... 379/213.01 |
| 2002/0103919 A1 | 8/2002 | Hannaway |
| 2002/0133247 A1 | 9/2002 | Smith et al. |
| 2005/0165942 A1 | 7/2005 | McDowall et al. |
| 2006/0007923 A1 * | 1/2006 | Boys ..................... 370/352 |

OTHER PUBLICATIONS

U.S. Appl. No. 08/984,722, filed Feb. 1997, Sass.

* cited by examiner

SYSTEM AND METHOD FOR LIMITING DEAD AIR TIME IN INTERNET STREAMING MEDIA DELIVERY

This application is a continuation of U.S. patent application Ser. No. 09/570,837 filed on May 12, 2000 now abandoned.

FIELD OF THE INVENTIONS

The inventions below relate to the field of internet communications.

BACKGROUND OF THE INVENTIONS

Recently, radiobroadcasters have begun transmitting their audio content over the internet, allowing consumers to listen to radio stations received over the internet and played through computer speakers. For a home user to receive radio station "netcasts" over the internet, the user must have a personal computer, an internet account, browser software such as Internet Explorer® or Netscape Navigator®, an audio processing software "plug-in" capable of processing audio information, and a radio simile graphical interface. An Internet Radio Receiver and Interface, described in our co-pending application U.S. application Ser. No. 09/334,846, hereinafter referred to as internet appliance, incorporates all of the necessary computer hardware and software needed to connect to the internet and communicate with various sources of audio information such as radiobroadcasters.

Audio files are typically large and if downloaded as a whole could take fifteen minutes of wait time for each one minute of audio played. A process called streaming audio allows the user to listen to the audio while it downloads to their internet appliance (as opposed to downloading a music file and playing the file after the download is complete). There are a number of streaming audio formats available. The common ones today include Real Networks G2 and G7, Microsoft Windows Media, Shoutcast MP3 and Icecast MP3.

When a user changes the internet radio station he is listening to, the internet appliance must (a) establish a data connection with the new internet radio station, (b) receive and store streaming audio data into a data buffer, and (c) start playing the streaming audio data from the head of the buffered data while adding new streaming audio data to the tail of the buffered data. Step (b) here is commonly called buffering or pre-buffering and may take on the order of several seconds to about 10 seconds or more depending on the user's connection quality to the network, network traffic, and the characteristics of the streaming audio to which the user is trying to connect. Currently, this dead air time is filled with silence and is visually represented (when the streaming media is received through a computer with a screen) with a small "progress bar" or message announces how much of the buffering has been completed. When the buffer level reaches 100% the user then starts to hear audio from the computer. Savvy internet radio listeners are accustomed to such delays in getting access to internet content. However, when one breaks the assumption that internet radio will always be listened to at a computer where the user is looking at some visual display, then the dead air time is annoying. Our internet radio appliances mimic the functionality of a traditional FM radio, allowing the user to listen to internet "radio stations" through an appliance that does not require a fully functional personal computer, and instead functions in a manner similar to a traditional radio or audio receiver. In the embodiment of our internet radio system, the dead air time is unacceptable and potentially confusing. The dead air time incident to buffering and pre-buffering, however, can be filled with audio content as desired.

SUMMARY

To address and eliminate dead air time incident to negotiation, buffering and pre-buffering when connecting an internet appliance to an internet media server, the system and method described below identify the dead air time and provide alternate audio content during negotiation, buffering and pre-buffering. "Pre-rolls", or short pieces of audio content, are stored in the internet appliance or a system management server and played during the dead air time. These pre-rolls are played during the time between the user selecting a new station and the start of the audio playing from the new station stream. Thus, the dead air time between changing internet radio stations has been eliminated.

DETAILED DESCRIPTION OF THE INVENTIONS

Figure 1:
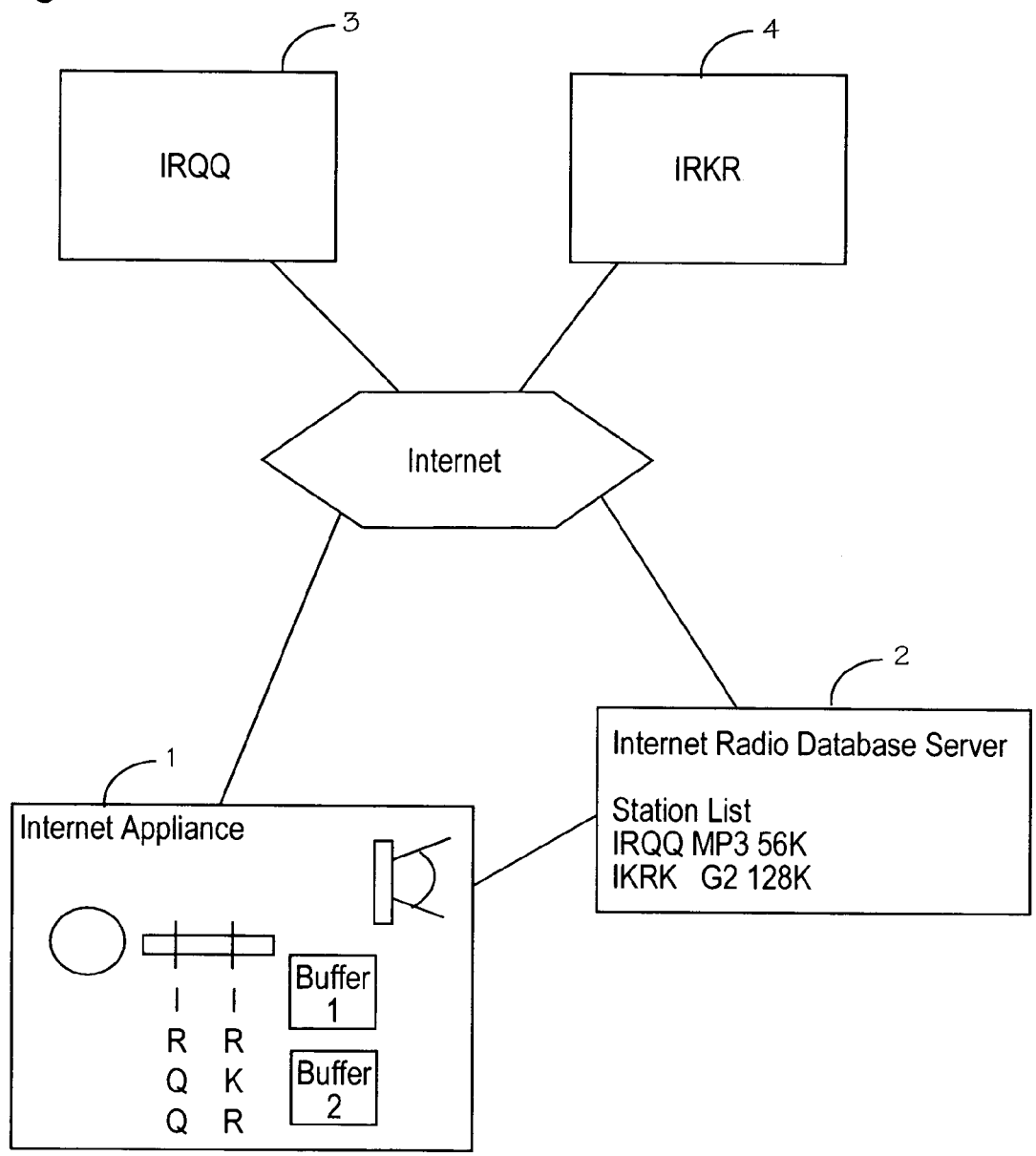
FIG. 1 is a block diagram of system.

FIG. 1 is a block diagram of the system and is comprised of an internet appliance 1, the system management server or internet radio database server 2 and the individual internet content providers, here shown internet radio station IRQQ 3 and internet radio station IRKR 4.

The internet appliance 1 is the user interface whereby the user can select the desired internet radio station by simply tuning it in, just as you would a traditional radio. The internet appliance 1 is fully described in our co-pending application Internet Radio Receiver and Interface, U.S. application Ser. No. 09/334,846 and incorporated herein in its entirety. Internet Radio Receiver and Interface describes devices and method for receiving radio broadcasts (webcasts) over the internet in a device that resembles a typical radio receiver. The hardware is housed in a radio box separate from a personal computer, and the interface is a panel of physical radio knobs, buttons, FM and AM channel indicators, etc., on the radio housing. Inside the radio box, necessary computer components and software permit connection to the internet and communication with various sources of audio information. In one embodiment, the device is a completely stand-alone device that a consumer can plug into a telephone line, ISDN line, local area network, or cable line and select radio stations with the same type of controls as a typical radio. In another embodiment, the device is a box that communicates with the internet through the user's personal computer, which must then have an internet connection and internet software installed and operating and communicate with audio components, to play the audio content. In third and fourth embodiments, the internet appliance is either a personal computer or a web TV with the necessary browser software, audio processing software, and radio simile graphical interface.

The internet content database server such as internet radio database server 2 processes the user's request and is the primary interface to the internet appliance 1. The internet radio database server 2 maintains, in this example, internet radio station information, including a list of stations (audio content providers), their streaming media format, bit rate output, and associated URL. The internet radio database server 2 also maintains a list of "pre-rolls", fully described below, for each of the internet radio stations. The internet radio database server 2 talks to the internet appliance 1 so that the server knows at what bit rate the user is connected to the internet (56K, ISDN, DLS for example) and what streaming media format the user's player requires (streaming MP3 for example).

Since audio data files are large, a process called streaming audio allows the user to listen to the audio while it downloads to their internet appliance. When the user selects an internet radio station, the internet appliance 1 sends a request to the internet radio database server 2. The internet radio database server responds with the URL of the internet radio station (the media content server) the user wants to play and also has instructions that tell what internet appliance audio processing software is required to play the requested audio content. The internet appliance, database server, and media content server negotiate to arrange the transmission of streaming audio content to the client. The requested audio content has, in most instances, been compressed and encoded. If the file was not compressed, the sound file would be too large and would be too long to send and be played with currently available internet connections. The requested audio content is transmitted in "packets" of compressed audio, and these packets are sent to a buffer on the internet appliance. Once the buffer is full, the internet appliance starts to play the audio. Thereafter, the streaming process provides an uninterrupted stream of audio content to the audio components of the client system. However, the negotiation and buffering take some several seconds, creating a long gap of time between selection of a station and eventual play of the station's audio content on the client's audio system.

To fill the gap, referred to by analogy as dead air time, short pieces of audio content are played during the time between the user selecting a new internet radio station and the start of audio playing from the new station stream. We refer to these short pieces of audio content as "pre-rolls" or "clips." From the user's perspective, this eliminates the dead time when changing stations. There are a number of possible content alternatives for the pre-rolls. The pre-roll can contain verbal announcement, to announce to the user the station identification such as "This is IRQQ Cool Jazz from San Francisco". There is the possibility of playing a musical clip from the station. Alternatively, a locally generated audio clip (from the user's ISP, for example) might be inserted also, for example, "You have new mail." The station identification or other clips might be mixed with a musical background which is longer than the spoken text and may be looped to cover an extended buffer time. Naturally, the announcement could also indicate the progress and status "buffering fifty percent completed".

The "pre-rolls" can be stored locally, in pre-roll storage 5, in the internet appliance playing the internet radio content as shown. Storage 5 may be any form of computer memory, including a computer hard disk, flash memory or the like. The pre-rolls do not require much storage if stored in a compressed format such as MP3. Locally generated audio content could also be generated by software either stitching together smaller audio pieces, a local synthesizer playing midi or a local software speech synthesizer.

Basically, any computer memory accessible to the client computer, either locally or through the internet, may be used to store any number of files of audio content suitable for use a pre-rolls. Pre-rolls could be stored on the system management server or on a separate a high performance server (not shown) which is in network terms on the internet, very close to the end user. This means that the expected jitter is low and the buffering for the pre-roll can be minimal. This network pre-roll could be combined with a local pre-roll on the local machine which might be only a second or two. This would allow more flexibility in the updating of the pre-rolls as they do not have to be sent to each end user's system.

The pre-rolls stored on the user's local system may be updated transparently to the user either when the system is idle or in the background when there is spare bandwidth. For example, user specific information (an announcement of waiting mail on the user's mail server) can be loaded into pre-roll storage during transmission of audio content. Pre-rolls for the user's favorite stations could be updated first and more often than those for stations infrequently used.

A clip could be stored from the last time the user listened to a particular internet radio station. One or more pre-rolls could be stored for each station in the database and the choice of which pre-roll is sent to a particular internet appliance could be on the basis of some user data such as language preference.

Figure 2A:
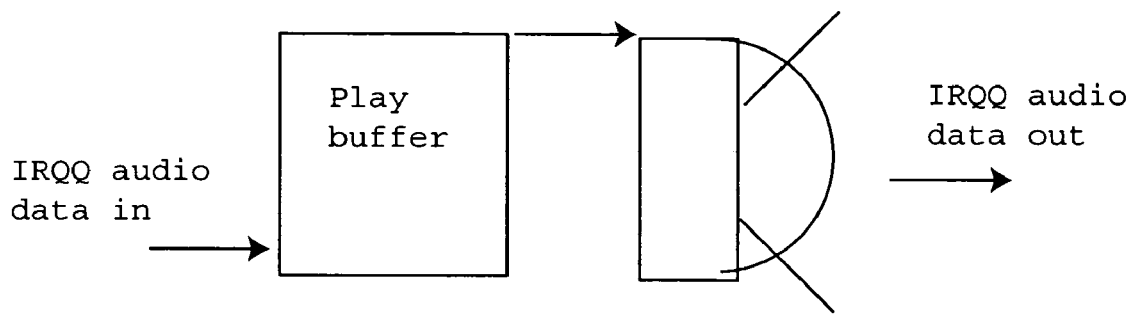
FIG. 2a is a block diagram of storing IRQQ audio data into the play buffer and playing IRQQ audio data out from the play buffer.
Figure 2B:
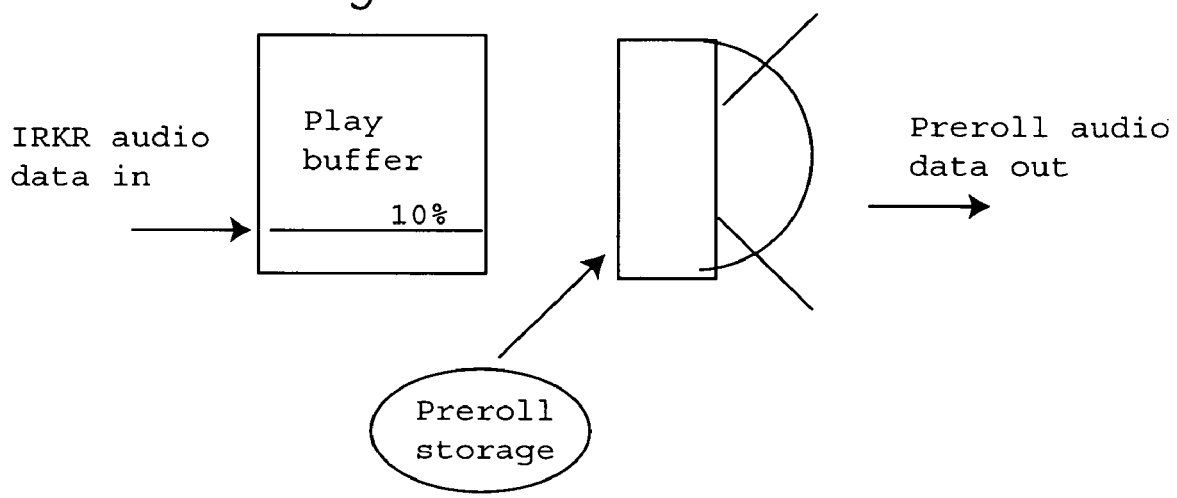
FIG. 2b is a block diagram of storing IRKR audio data into the play buffer and playing pre-roll data out from the pre-roll storage.
Figure 2C:
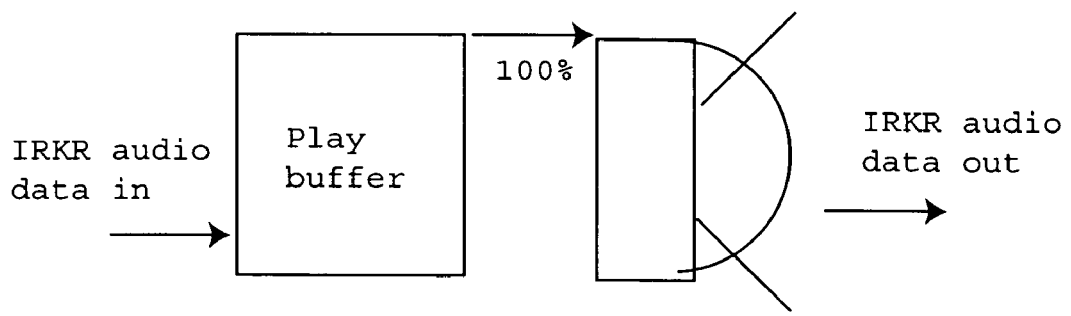
FIG. 2c is a block diagram of storing IRKR audio data into the play buffer and playing IRKR audio data out from the play buffer.

In the system shown in FIG. 1 and detailed in FIGS. 2*a* through 2*c*, the user is already tuned to internet radio station IRQQ 3, and is receiving streaming audio in an uninterrupted steady state. Packets of data arrive from IRQQ and are added to the tail of the play buffer while audio is played from the head of the play buffer, shown in FIG. 2*a*. The size of the play buffer decreases if there is network congestion and packets arrive late. The user hears audio from IRQQ, slightly delayed in time due to both network transport delay but more significantly, due to the play buffer. The internet appliance is still playing from IRQQ. The user then turns the tuning knob (or station selector) to select IRKR. The system management server is programmed to communicate with the client computer and receive the request for IRKR, and direct the client computer to play at least one of the pre-roll audio files while the client computer is negotiating a connection with the audio content provider IRKR and buffering content provided in streaming media format by IRKR's server. The internet appliance starts feeding data from the locally stored pre-roll for IRKR to the user, shown in FIG. 2*b*. The user hears the pre-roll for IRKR start essentially immediately. The internet radio appliance requests the stream for the new station and the internet radio database server redirects the internet radio appliance to the stream from IRKR. The pre-roll for IRKR continues to play. The internet radio appliance and the internet radio station IRKR negotiate a connection and the audio is buffered into the play buffer. The pre-roll continues and if the negotiation and buffering take a long time the internet radio appliance might insert a message to say that the buffering is 75% completed for example. When the play buffer is sufficiently full, the audio is switched from the pre-roll to the stream from the play buffer, shown in FIG. 2*c*. Switch over from the pre-roll to the streaming media is accomplished by the client computer upon determining that the play buffer is sufficiently full. The user now starts to hear the stream from IRKR.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A system management server comprising:
   a processor; and
   a memory medium coupled to the processor, wherein the memory medium has stored therein program instructions executable to:
   receive a request from a client computer to establish a connection over a communication network to receive streaming audio content from a first audio content provider;
   in response to receiving a subsequent request from the client computer to establish a connection with a second audio content provider, direct the client computer to stop playing streaming audio content from the first audio content provider and to play one or more of a plurality of audio files until the client computer establishes a connection with the second audio content provider and completes buffering a predetermined amount of streaming audio content provided by the second audio content provider;
   in response to the client computer buffering the predetermined amount of streaming audio content provided by the second audio content provider, direct the client computer to stop playing the one or more audio files and begin playing streaming audio content provided by the second audio content provider;
   wherein the one or more audio files are distinct from streaming audio content from the first and second audio content providers, and wherein at least one of the one or more audio files provides, when played, an audible identification of one or more of the first and second audio content providers.

2. The system management server of claim 1, wherein the program instructions are further executable by the processor to direct the client computer to, in response to the system management server providing a directive to play one or more of the plurality of audio files, stop receiving streaming audio content from the first audio content provider.

3. The system management server of claim 1, wherein at least a subset of the plurality of audio files are musical clips of musical content associated with one or more of the first and second audio content providers.

4. The system management server of claim 1, wherein at least a subset of the plurality of audio files are audio clips that, when played, audibly indicate the status of said buffering of the streaming audio content provided by the second audio content provider.

5. The system management server of claim 1, wherein the first and second audio content providers are Internet radio stations, wherein the at least one of the one or more audio files is an audio clip that provides, when played, an audible identification of one or more of the Internet radio stations.

6. The system management server of claim 1, wherein the program instructions are further executable by the processor to, in response to receiving a request from the client computer, provide the client computer an address for establishing a connection with one of the audio content providers.

7. The system management server of claim 1, wherein said plurality of audio files are stored in one of the memory medium of the system management server or a memory medium of the client computer.

8. The system management server of claim 1, comprising a memory accessible to the client computer via the network, wherein said plurality of audio files are stored within said memory.

9. The system management server of claim 1, wherein a portion of each of the plurality of audio files is stored in a memory medium of the client computer, and the remaining portion is stored in the memory medium of the system management server.

10. The system management server of claim 1, wherein said plurality of audio files are stored on a memory medium of the client computer.

11. The system management server of claim 1, wherein the communication network is the Internet.

12. The system management server of claim 1, wherein the audible identification includes at least the name of the audio content provider.

13. The system management server of claim 1, wherein the audible identification includes a verbal announcement of at least the name of the audio content provider and the musical genre associated with the audio content provider.

14. The system management server of claim 1, wherein the audible identification includes a verbal announcement of at least the name of the audio content provider and the musical genre and city associated with the audio content provider.

15. The system management server of claim 1, wherein at least a subset of the plurality of audio files are audio clips that provide audible status information associated with the communication network.

16. The system management server of claim 1, wherein at least a subset of the plurality of audio files are locally generated audio clips that provide audible status information associated with the client computer.

17. The system management server of claim 1, wherein the one or more audio files are audio clips that provide audible status information associated with the second audio content provider.

18. The system management server of claim 1, wherein the one or more audio files are audio clips that provide audible identification information associated with the second audio content provider.

19. The system management server of claim 1, wherein the one or more audio files are musical clips of musical content associated with the second audio content provider.

20. A method for communicating with a client computer and a plurality of audio content providers via a communication network, wherein the plurality of audio content providers includes a first audio content provider and a second audio content provider, the method comprising:
   receiving a request from the client computer to establish a connection over the communication network to receive streaming audio content from the first audio content provider;
   in response to receiving a subsequent request from the client computer to establish a connection with a second audio content provider, directing the client computer to stop playing streaming audio content from the first audio content provider and to play one or more of a plurality of audio files until the client computer establishes a connection with the second audio content provider and completes buffering a predetermined amount of streaming audio content provided by the second audio content provider;
   in response to the client computer buffering the predetermined amount of streaming audio content provided by the second audio content provider, directing the client computer to stop playing the one or more audio files and begin playing streaming audio content provided by the second audio content provider;
   wherein the one or more audio files are distinct from streaming audio content from the first and second audio content providers, and wherein at least one of the one or more audio files provides, when played, an audible identification of one or more of the plurality of audio content providers.

21. The method of claim 20, further comprising in response to the system management server providing a directive to play one or more of the plurality of audio files, directing the client computer to stop receiving streaming audio content from the first audio content provider.

22. A client computer, comprising:
a processor; and
a memory medium coupled to the processor, wherein the memory medium has stored therein program instructions executable to:
send a request to a system management server to establish a connection over a communication network to receive streaming audio content from a first audio content provider;
in response to said sending a subsequent request to the system management server to establish a connection with a second audio content provider, receive a command from the system management server;
in response to receiving the command from the system management server:
stop playing streaming audio content from the first audio content provider;
play one or more of a plurality of audio files;
establish a connection with the second audio content provider;
buffer a predetermined amount of streaming audio content provided by the second audio content provider;
stop playing the one or more audio files; and
begin playing streaming audio content provided by the second audio content provider;
wherein the one or more audio files are distinct from streaming audio content from the first and second audio content providers, and wherein at least one of the one or more audio files provides, when played, audible identification of one or more of the first and second audio content providers.

23. The system of claim 22, wherein the program instructions are further executable by the processor to, in response to receiving the command from the system management server, stop receiving streaming audio content from the first audio content provider.

24. A system management server, comprising:
a processor; and
a memory medium coupled to the processor, wherein the memory medium has stored thereon program instructions executable to:
receive a request from a client computer to establish a connection over a communication network to receive streaming audio content from a first audio content provider;
in response to receiving a subsequent request from the client computer to establish a connection with a second audio content provider, direct the client computer to stop playing audio content from the first audio content provider and to play one or more of a plurality of audio files until the client computer establishes a connection with the second audio content provider and completes buffering a predetermined amount of streaming audio content provided by the second audio content provider;
in response to the client computer buffering the predetermined amount of streaming audio content provided by the second audio content provider, direct the client computer to stop playing the one or more audio files and begin playing streaming audio content provided by the second audio content provider, wherein the one or more audio files are distinct from streaming audio content from the first and second audio content providers;
wherein the selection of the one or more of the plurality of audio files is based on user preference information associated with a user of the client computer.

25. The system management server of claim 24, wherein the user preference information includes at least language preference information.

26. A system management server, comprising:
a processor; and
a memory medium coupled to the processor, wherein the memory medium has stored thereon program instructions executable to:
receive a request from a client computer to establish a connection over a communication network to receive streaming audio content from a first audio content provider;
in response to receiving a subsequent request from the client computer to establish a connection with a second audio content provider, direct the client computer to stop playing streaming audio content from the first audio content provider and to play one or more of a plurality of audio files until the client computer establishes a connection with the second audio content provider and completes buffering a predetermined amount of streaming audio content provided by the second audio content provider;
in response to the client computer buffering the predetermined amount of streaming audio content provided by the second audio content provider, direct the client computer to stop playing the one or more audio files and begin playing streaming audio content provided by the second audio content provider;
wherein the one or more audio files are distinct from streaming audio content from the first and second audio content providers, and wherein at least one of the one or more audio files provides audible information to a user of the client computer, wherein, when the information associated with one or more of the audio clips changes, the one or more audio clips are updated transparently to the user.

27. The system management server of claim 26, wherein each audio file is associated with one of the plurality of audio content providers, and wherein the program instructions are further executable to, if the information associated with one or more of the audio files changes, update the audio files associated with user preferred audio content providers before the audio files associated with other audio content providers.

28. The system management server of claim 26, wherein the program instruction are further executable to transparently update the audio files to the user when there is spare bandwidth during transmission of the streaming audio content.

29. A system management server, comprising:
a processor; and
a memory medium coupled to the processor, wherein the memory medium has stored therein program instructions executable to:
receive a request from a client computer to establish a connection over a communication network to receive streaming audio content from a first audio content provider;

in response to receiving a subsequent request from the client computer to establish a connection with a second audio content provider, direct the client computer to stop playing streaming audio content from the first audio content provider and to play one or more of a plurality of audio files until the client computer establishes a connection with the second audio content provider and completes buffering a predetermined amount of streaming audio content provided by the second audio content provider;

in response to the client computer buffering the predetermined amount of streaming audio content provided by the second audio content provider, direct the client computer to stop playing the one or more audio files and begin playing streaming audio content provided by the second audio content provider;

wherein the one or more audio files are distinct from streaming audio content from the first and second audio content providers, and wherein at least one of the one or more audio files audibly indicate the status of said buffering of the streaming audio content provided by the second audio content provider.

30. A system management server, comprising:

a processor; and a memory medium coupled to the processor, wherein the memory medium has stored therein program instructions executable to:

receive a request from a client computer to establish a connection over a communication network to receive streaming audio content from a first audio content provide;

in response to receiving a subsequent request from the client computer to establish a connection with a second audio content provider, direct the client computer to stop playing streaming audio content from the first audio content provider and to play one or more of a plurality of audio files until the client computer establishes a connection with the second audio content provider and completes buffering a predetermined amount of streaming audio content provided by the second audio content provider, wherein the one or more audio files are distinct from streaming audio content from the first and second audio content providers, and wherein at least one of the one or more audio files include audible identification information and/or audible status information associated with the second audio content provider.

* * * * *